(12) United States Patent
Sternbach

(10) Patent No.: US 8,517,652 B2
(45) Date of Patent: Aug. 27, 2013

(54) WING WALL ANCHOR

(76) Inventor: Jozsef Sternbach, Scarsdale, NY (US)

( * ) Notice: Subject to any disclaimer, the term of this patent is extended or adjusted under 35 U.S.C. 154(b) by 160 days.

(21) Appl. No.: 12/722,097

(22) Filed: Mar. 11, 2010

(65) Prior Publication Data

US 2011/0222985 A1    Sep. 15, 2011

(51) Int. Cl.
*F16B 21/00*    (2006.01)
(52) U.S. Cl.
USPC .......................................... 411/342; 411/347
(58) Field of Classification Search
USPC .................................. 411/340–346, 347, 349
See application file for complete search history.

(56) References Cited

U.S. PATENT DOCUMENTS

| 1,878,579 | A | * | 9/1932 | Gober | 411/340 |
|---|---|---|---|---|---|
| 1,915,509 | A | * | 6/1933 | Adam | 292/256.73 |
| 2,403,247 | A | * | 7/1946 | Sullivan | 411/551 |
| 2,696,138 | A | * | 12/1954 | Olschwang | 411/341 |
| 2,945,705 | A | * | 7/1960 | Murray | 285/18 |
| 2,979,797 | A | * | 4/1961 | Murphy | 411/458 |
| 4,722,649 | A | * | 2/1988 | Ferguson | 411/341 |
| 6,314,703 | B1 | * | 11/2001 | Ikuta et al. | 52/713 |
| 6,318,941 | B1 | * | 11/2001 | Guenther | 411/342 |

* cited by examiner

*Primary Examiner* — Flemming Saether

(57) ABSTRACT

A winged wall anchor having wings pivotally connected with a rivet and spring biased to an open position. The wings pivot about the rivet axis so that they can open parallel to the wall which allows the wings to open even when they are adjacent an obstacle and requires substantially less backspace.

4 Claims, 2 Drawing Sheets

WING WALL ANCHOR

BACKGROUND OF INVENTION

Anchors for use in hollow core walled building are known. However, such conventional anchors are limited because they generally require a large amount of space to operate.

BRIEF SUMMARY OF INVENTION

This invention, in its creation is intended to provide a more effective fastening system than other existing publicly consumable fasteners. These products have a wide range, and include any and all commercial or residential framed hollow core building wall construction.

The general idea of the winged wall anchor is that its wings are opened by a spring parallel to the wall therefore enabling the anchor to open even when placed near a stud or side of a masonry hollow wall as well as requiring minimum of back space for the threaded bolt used as opposed to the presently available toggle bolt type of devices backspace requirement.

BRIEF DESCRIPTION OF DRAWING VIEWS

Figure 1:
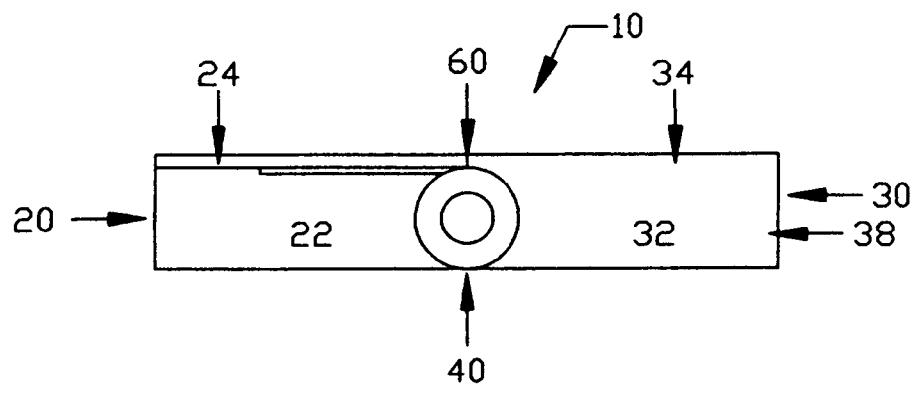
Figure 2:
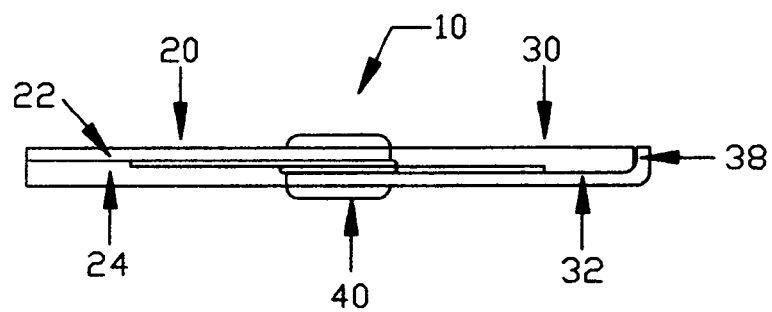
Figure 3:
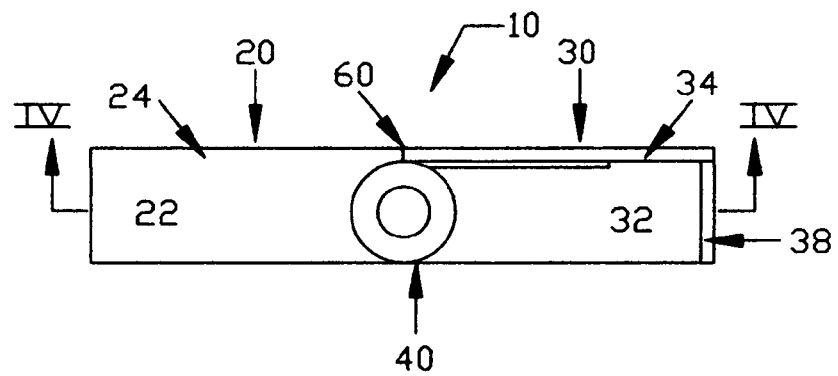
Figure 4:
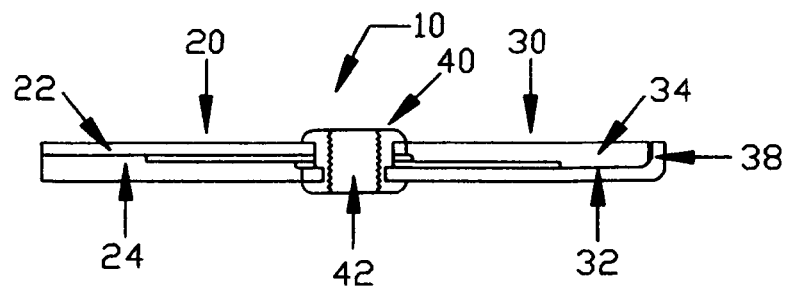

FIG. 1—A bottom view of the anchor in the fully open position.
FIG. 2—A front view of the anchor in the fully open position.
FIG. 3—A top view of the anchor in the fully open position.
FIG. 4—A cross-sectional view along IV-IV
FIG. 5—Isometric view of the anchor in the closed position.
FIG. 6—Isometric view of the anchor in the fully open position.
FIG. 7—Exploded view of the anchor.

DETAILED DESCRIPTION OF THE INVENTION

The winged wall anchor is a fastening device fabricated from cold rolled coated steel, and with design features integrated into the assembled parts which allow it to be used as a wall anchor for the attachment of various wall mounted fixtures on to hollow core walls.

Referring to FIGS. 1-7 a winged wall anchor (10) is disclosed. The winged wall anchor (10) includes an upper wing (20), a lower wing (30), a rivet (40), and a spring (50).

Figure 5:
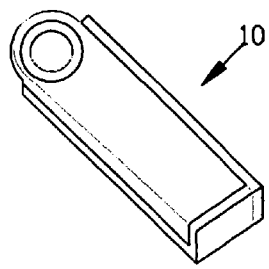
Figure 6:
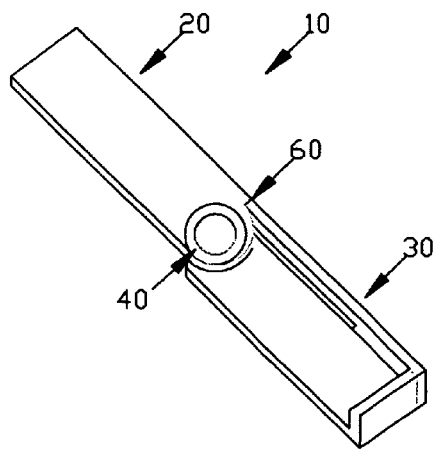
Figure 7:
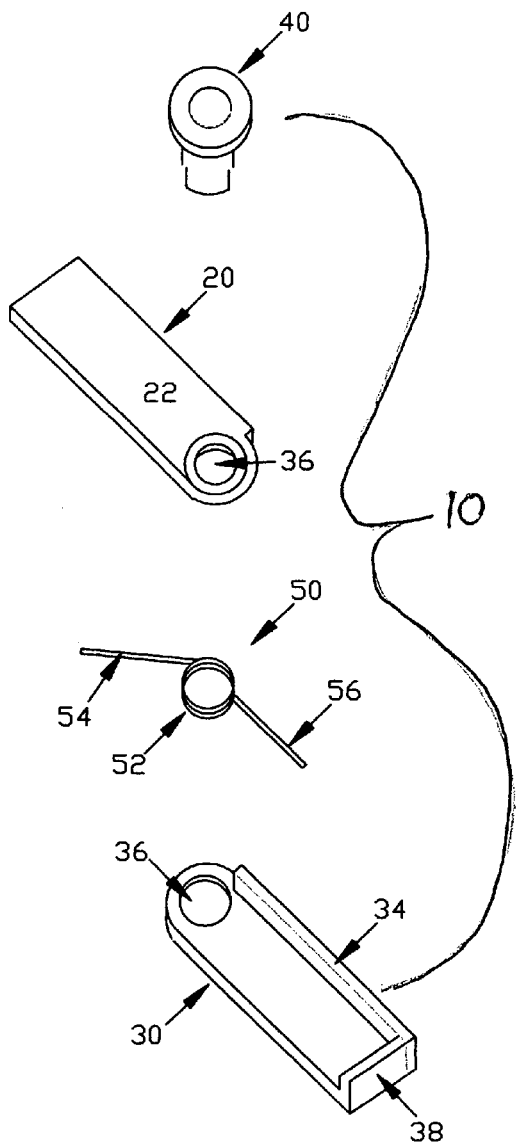

The rivet pivotally connects the upper and lower wings so the wings can pivot relative to one another around the axis of the rivet between a fully open position as seen in FIG. 6 and a closed position as seen in FIG. 5. The rivet is hollow with a central aperture having internal threads (42) spiraling around the axis which can be produced in sizes including ⅛, 3/16, ¼, ⅜ and ½ inch thread sizes.

The upper wing includes a planner body (22) having a generally rectangular shape with a perpendicular wall (24) along one of the long sides of the rectangle and an aperture at one of the ends (36) for receiving the rivet. The lower wing likewise has a planner body (32) generally rectangular shape with a perpendicular wall (34) along one of the long sides of the rectangle and an aperture at one of the ends (36) for receiving the rivet but further includes another perpendicular wall (38) along one of the short sides so that when the upper and lower wings are connected a pocket is formed there between when the anchor is in the closed position. The ends of the perpendicular walls further form a stop (60) for stopping the wings from pivoting beyond the fully open position where the wings are generally aligned in a straight line as seen in FIGS. 1-4 and 6.

The spring is located with coiled portion (52) around the rivet and with a first straight end (54) and a second straight end (56). The first end engages the perpendicular wall of the upper wing and the second end engages the perpendicular wall of the lower for biasing the wings towards the fully open position.

The following is the procedure for the fabrication of the Winged Wall Anchor. First the cold rolled coated steel sheet (gauge depends on the size of the fastener) is punch cut and press formed in to shapes of the upper and lower halves of the fastener. Next coated steel wire is bent into the required spring and cut to length/gauge also depends on size of fastener. Last a machined rivet, sized by thru threading ⅛" to ½", will join the appropriate lower wing, spring and upper wing, by riveting the three moving parts in to the Winged Wall Anchor.

The following is an example of the use of the Winged Wall Anchor. In the installation of a shelf bracket on to a gypsum wall board (GWB) wall. Depending on the weight the shelf will have to support, select the appropriate size Winged Wall Anchor. Layout the holes for the anchors as per the bracket and drill the appropriate size holes into the GWB. Put the bolts through the holes in the bracket and screw into the anchor so it is flush with the back of the nut. While holding the lower anchor in the closed position, insert it into the lower hole, do the same with the upper anchor. Tighten all screws to draw the wings secure to the GWB.

What is claimed is:

1. A fastening anchor assembly for fastening an object to a hollow wall having a hole therethrough of a specified diameter, the assembly comprising:
    an upper wing having a planner body with a generally rectangular shape;
    a lower wing having a planner body with a generally rectangular shape;
    each of the upper and lower wings include an aperture at an end thereof, a rivet having a longitudinal axis is located in the apertures to connect the upper and lower wings in a manner where the wings can pivot relative to one another around said longitudinal axis of the rivet between an open position and a closed position, the rivet includes a central aperture with an internal thread spiraling around said longitudinal axis;
    a spring located with a coiled portion coiled around the rivet between the upper and lower wings and with a first end engaging the upper wing and a second end engaging the lower wing to bias the wings to a fully open position where the upper and lower wings are generally aligned in a straight line and;
    wherein the wings are capable of being held in the closed position, where the wing bodies are in a relationship where they are facing one another, for the anchor to be inserted into the hole in the hollow wall.

2. The fastening anchor assembly of claim 1 wherein: the upper and lower wing bodies each have a perpendicular wall extending from a long side of the planner body; the ends of the spring engage the perpendicular walls.

3. The fastening anchor assembly of claim 2 wherein: the lower wing further includes another perpendicular wall at the end opposite the aperture.

4. The fastening anchor assembly of claim 1 wherein: each of the wings includes a stop for stopping the wings from pivoting beyond the fully open position.

* * * * *